Aug. 20, 1940.   C. C. BALDWIN   2,212,465
COMBINE
Filed Sept. 25, 1937   4 Sheets-Sheet 1

INVENTOR
Curtis C. Baldwin
BY Thos. E. Scofield
ATTORNEY

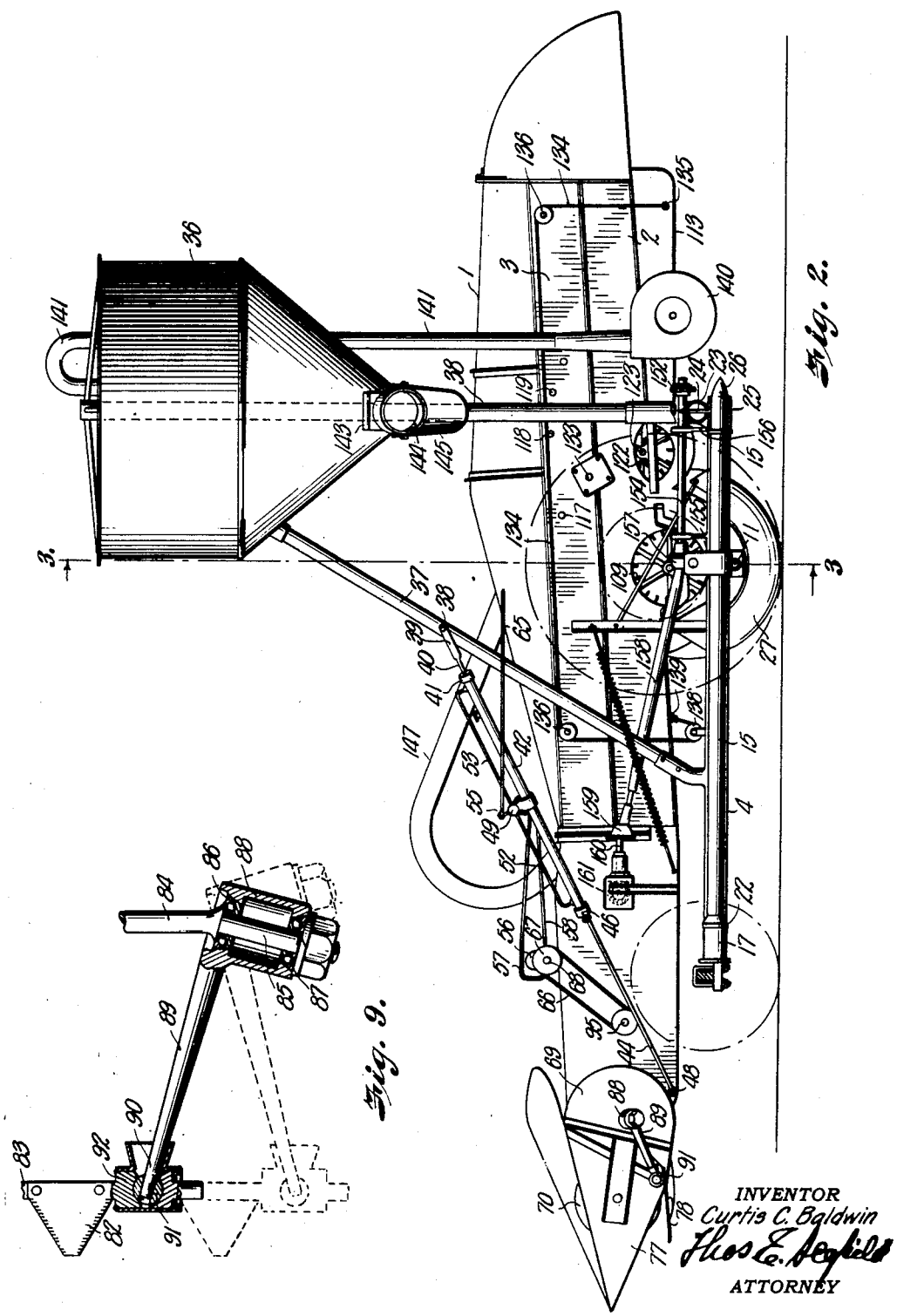

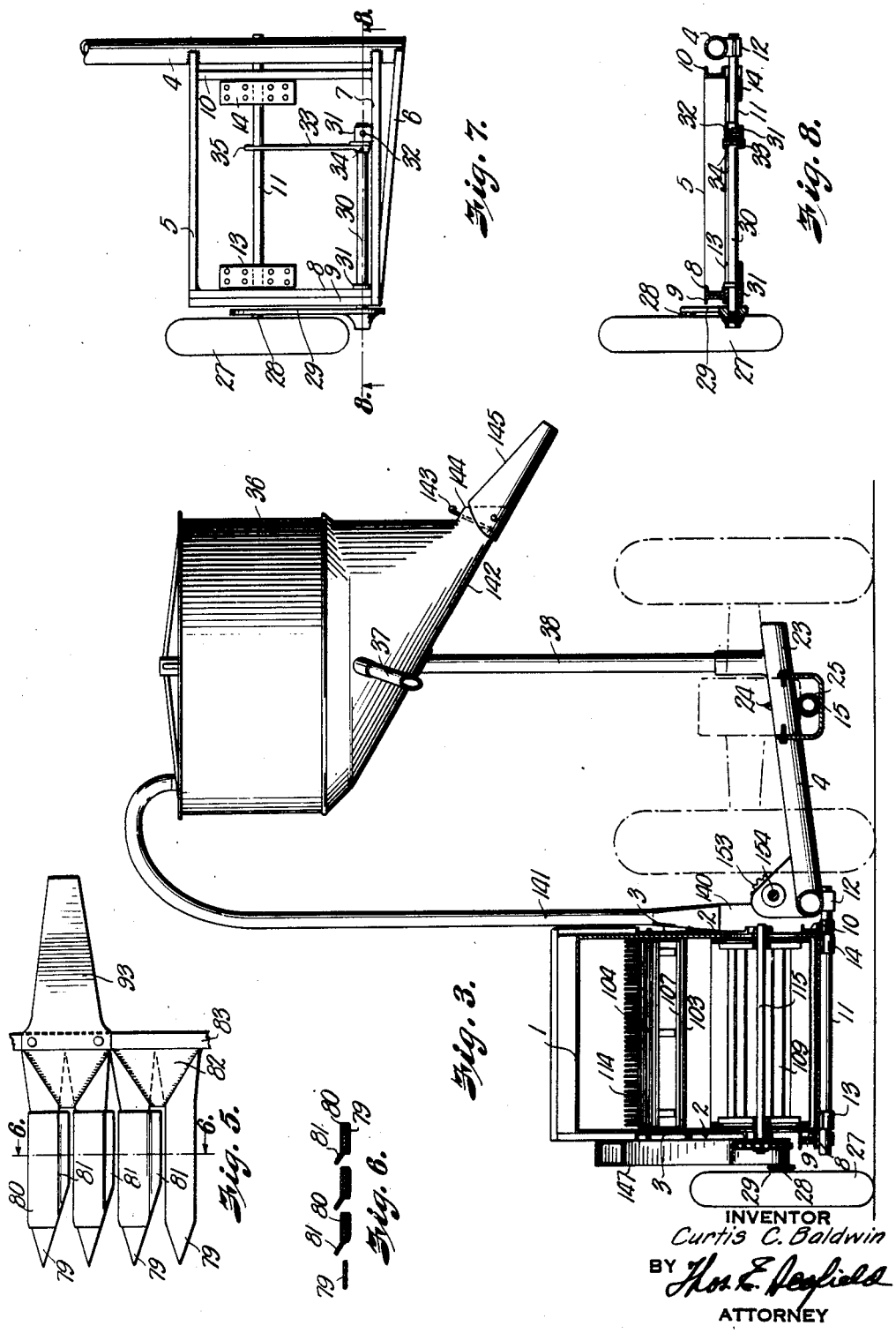

Aug. 20, 1940.  C. C. BALDWIN  2,212,465
COMBINE
Filed Sept. 25, 1937   4 Sheets-Sheet 4
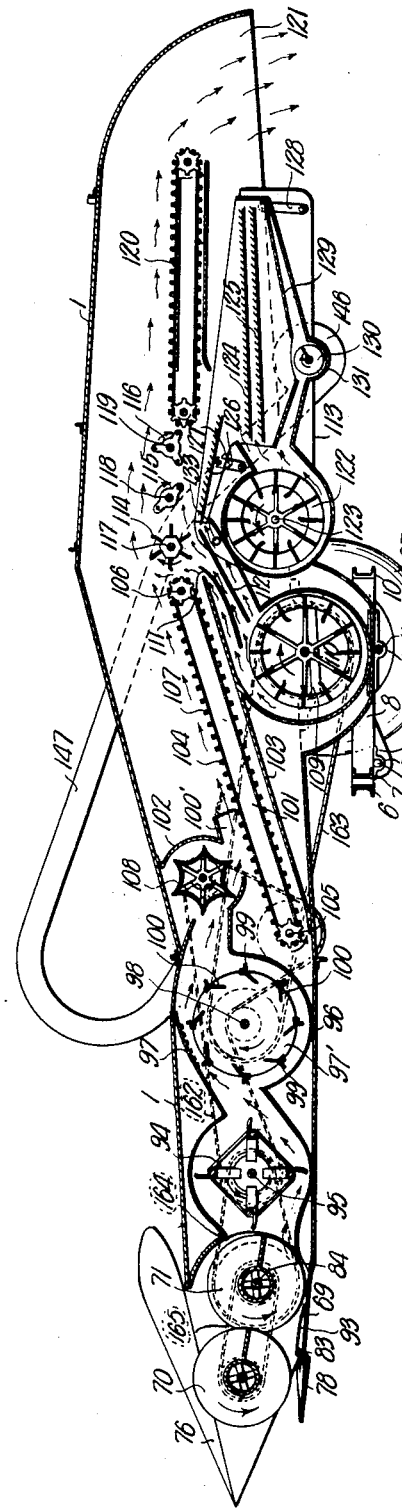
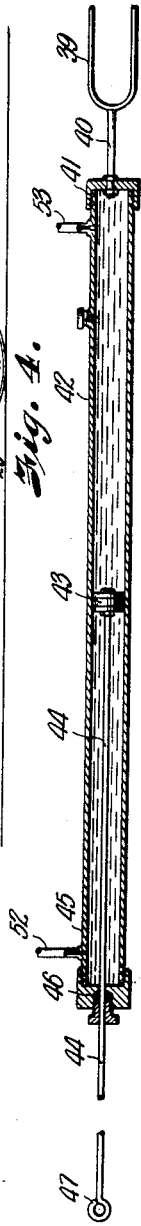
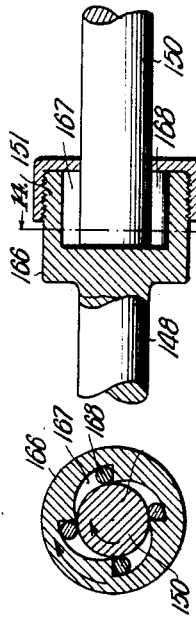
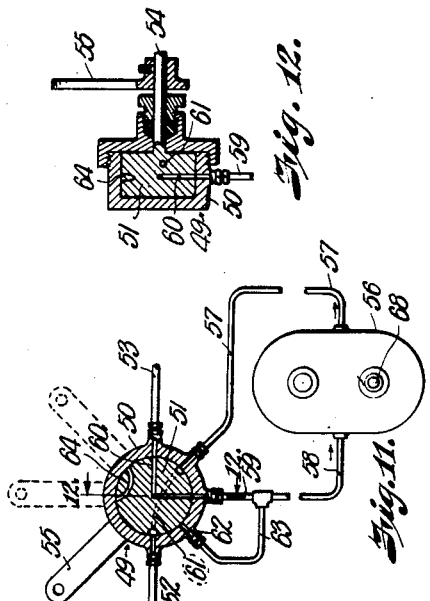
INVENTOR
Curtis C. Baldwin
BY
ATTORNEY Patented Aug. 20, 1940

2,212,465

UNITED STATES PATENT OFFICE 2,212,465

COMBINE

Curtis C. Baldwin, San Bernardino, Calif., assignor to Rotary Reaper Corporation, Kansas City, Mo., a corporation of Missouri Application September 25, 1937, Serial No. 165,713

7 Claims. (Cl. 56—20)

My invention relates to combines and more particularly to a device for harvesting and threshing wheat.

Combines of the prior art have been large machines, rather expensive in price, with the result that they could be used only on large farms.

One object of my invention is to provide a combine which may be constructed of such small dimensions that it may be cheaply manufactured and may be available for farmers having smaller sized tracts.

Another object of my invention is to provide a novel combine structure which may be employed with automotive tractors commonly in use for other purposes.

Another object of my invention is to provide a novel construction for attaching the combine proper to the tractor.

Another object of my invention is to provide a novel mounting means for a combine to be used in connection with a tractor.

Another object of my invention is to provide a novel combine structure.

Another object of my invention is to provide a simple and expeditious sickle bar drive for use in a combine.

Other and further objects of my invention will appear from the following description.

In the accompanying drawings which form part of the instant specification and are to be read in conjunction therewith, and in which like reference numerals are used to indicate like parts in the various views;

Figure 2 is a side elevation of my combine with parts of the mounting in section.

Figure 3 is a sectional view taken on the line 3—3 of Figure 2.

Figure 4 is a sectional view taken on the line 4—4 of Figure 1.

Figure 5 is an enlarged fragmentary plan view of a portion of the guards and the sickle bar.

Figure 6 is a sectional view taken on the line 6—6 of Figure 5.

Figure 7 is a fragmentary detail view of the combine ground wheel suspension with the combine removed.

Figure 8 is a sectional view taken on the line 8—8 of Figure 7.

Figure 9 is an enlarged detail view with parts in section, of my sickle bar drive.

Figure 10 is an enlarged sectional view of a portion of the combine angle positioning cylinder.

Figure 11 is a fragmentary view, with parts in section, of the combine positioning operating valve.

Figure 12 is a sectional view taken along the line 12—12 of Figure 11.

Figure 13 is an enlarged fragmentary sectional view of the connection between an auxiliary motor and the tractor motor.

Figure 14 is a sectional view taken on the line 14—14 of Figure 13.

Figure 1:
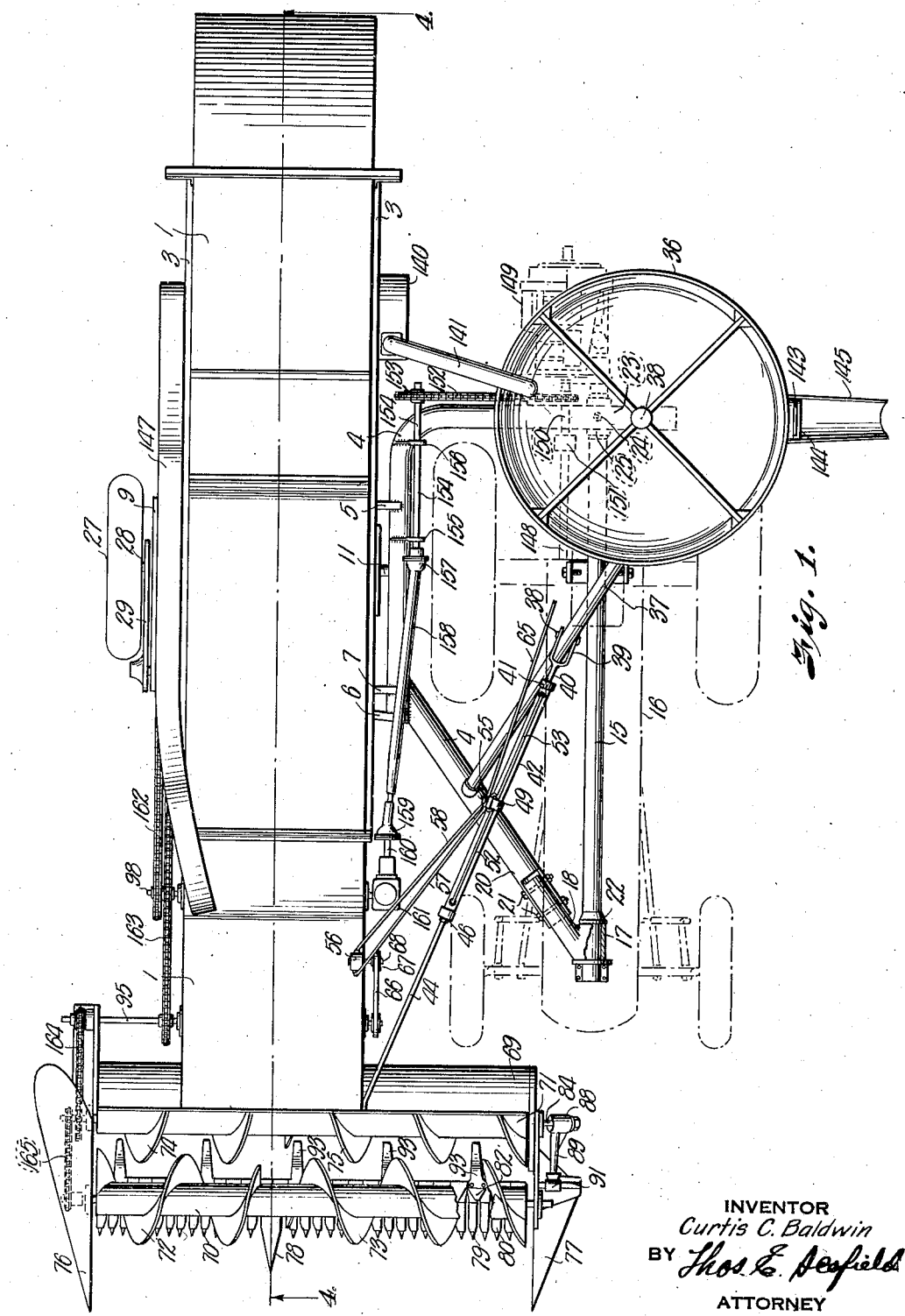
Figure 1 is a plan view of my combine, showing the tractor in connection with which it is used in dotted lines.

Referring now to the drawings, the harvesting and threshing arrangement proper is mounted in a housing 1, which is formed in part by longitudinally extending channel members 2 and 3, of sufficient strength and length to give the housing longitudinal rigidity, enabling it to be supported about a pivot. The weight of the harvesting and threshing arrangement is carried by a frame shown in Figures 1, 2, and 3. The frame comprises a generally U-shaped tubular member 4 which may be made of a single piece of tubing bent to shape or built up of pieces of tubing welded to form an integral member. To the tubing 4 are welded structural members 5, 6, and 7, which may be I-beams, channels or the like. Transverse structural members 8, 9 and 10 are welded to members 5 and 6 as can readily be seen by reference to Figures 7 and 8. An axle 11 is mounted in suitable bearings 12, secured to a frame 4 and members 8 and 9 respectively. The axle carries bearing members 13 and 14 upon which bearing members the housing 1 is mounted. It will be obvious that the housing 1 is free to pivot about axle 11.

The U-shaped tubular member 4 and the integral structure comprised by members 5, 6, 7, 8, 9, and 10 forms the framework supporting the combine. A tubular member 15 is mounted underneath the tractor 16. A sleeve 17 is pivotally mounted around the tubular member 15, the sleeve being formed with an angularly extending arm 18 adapted to telescope within the end 20 of the tubular member 4 of the frame. The end 20 is secured to the arm 18 by means of bolts 21. The tube 15 is formed with a thrust collar 22.

The other end 23 of tubular member 4 is pivoted about a pin 24. The pin 24 is mounted in a bushing 25 supported by the tubular member 15 which is formed with a pointed end 26 as can readily be seen by reference to Figure 2.

The frame formed by the tubular member 4 and the members 5, 6, and 7, welded thereto, is supported from the tractor through tubular member 15 at two points, namely at sleeve 17 and at bushing 25. The points of support, furthermore, are pivots around a longitudinal axis of the tractor, extending in the direction of movement. The outboard side of the frame is supported from the ground wheel through a resilient connection. The ground wheel 27 is pivoted on a stub axle 28 which is mounted upon an arm 29. The arm 29 is keyed to shaft 30 which is free to turn in a bearing 31. This can be readily seen by reference to Figures 7 and 8. The outer end of shaft 30 passes through a bearing 31 in which it is secured by pin 32 against rotation. In order to further secure the outer end of shaft 30 from rotating, an arm 33 is pinned by pin 34 to the shaft 30, the other end 35 of arm 33 being provided with an opening through which axle 11 extends. The weight of the assembly is transmitted to the wheel through bearing 31, shaft 30, arm 29, and stub shaft 28. The resilient support is achieved through torsion of shaft 30 which tends to twist under load.

From the foregoing it will be clear that the framework which supports the combine proper is mounted for towing alongside of the tractor 16 and is supported from three points. As the wheel 27 encounters irregularities in the ground, shock is taken by torsion of shaft 30 and irregularities in countour of the ground are compensated for by a pivoting of the framework at sleeve 17 and bushing 25 around the tube 15 which is secured to the tractor. As the tractor moves ahead, the thrust bearing 22 acting upon the sleeve 17 will tow the framework and hence the combine mounted thereon.

If it is desired to uncouple the tractor from the combine, this can be accomplished very simply by removing bolts 21. As the tractor is moved ahead, the framework will move with the single ground wheel 27, while the framework will pivot around pin 24. The bushing 25 may then readily be slipped rearwardly from the tube 15 and the tractor is disconnected. The tractor is connected in the reverse manner, that is, the bushing is slipped on tube 15 over the pointed end 26 and the connection between the end 20 of tubular member 4 and the arm 18 is made.

A grain hopper 36 is supported from the framework by tubular supports such as 37 and 38. A fork 39 is secured to tubular support 37 by means of pin 38. The end 40 of the fork is secured to one end 41 of a hydraulic cylinder 42. A piston 43 is housed within hydraulic cylinder 42 as can readily be seen by reference to Figure 10. A piston rod 44 is secured to the piston 43 and extends out through the end 45 of the hydraulic cylinder through a suitable stuffing box 46. The outer end of piston rod 44 is formed with an eye 47, which is secured to the housing at a forward point by a pin 48, as can readily be seen by reference to Figure 2. The position of the piston 43 within the cylinder 42 determines the position of the housing. In other words, if the front end of the combine is to be raised, the piston 43 will be moved to the right as viewed in Figure 10.

The moving of piston 43 is controlled by valve 49 shown in detail in Figures 11 and 12. The valve consists of a valve housing 50 in which is mounted a rotary valve 51 provided with ports shown in Figure 12. Adjacent the end 45 of the cylinder 42 is a pipe 52. Adjacent the end 41 of the cylinder 42 is a pipe 53. The rotary valve 51 is controlled through shaft 54 to which is secured an operating lever 55. A gear pump 56 is driven from any suitable power source, as for example, belt 66 rotating pulley 67 secured to shaft 68 of the pump, as can readily be seen by reference to Figure 2. The gear pump 56 is adapted to take suction through pipe 58 and discharge through pipe 57. With the position of parts shown in Figure 11, oil is being pumped through pipe 57, through duct 61, through pipe 52 out into the cylinder 42, moving piston 43 to the right and raising the front end of the housing. The oil in front of the piston escapes through pipe 53, passes through the duct 60 in the rotary valve, through pipe 59, through pipe 58, to the suction side of pump 56. When the operating lever 55 is moved to the central position, duct 60 will bridge the port to which pipe 57 is connected and port 62, so that oil will discharge through pipe 57, pass through duct 60, port 62, through pipe 63 and return to the suction side of the pump through pipe 58. It will be noted that, in this position, both pipes 52 and 53 are sealed so that the housing will remain in the position placed. When the operating lever is moved to the extreme right, as viewed in Figure 11, the duct 64 will place pipe 57 in communication with pipe 53 and the duct 60 will place pipe 52 in communication with pipe 59. Oil will then be pumped through pipe 57, through duct 64, through pipe 53, into the cylinder 42, moving the piston 43 to the left and lowering the front end of the housing 1. Oil displaced from in front of the piston 43 will escape through pipe 52 and pass through duct 60 into pipe 59 and return through pipe 58 to the suction side of the pump.

The operating lever 55 is provided with an operating rod 65 as can be seen by reference to Figure 2, enabling the position of the housing to be adjusted from the driver's seat (not shown) of the tractor.

Referring now to Figure 1, carried by the front end of the housing 1 is a widened pan 69 in which are mounted feeding screws 70 and 71. Feeding screw 70 is formed with oppositely directed flights 72 and 73, while feeding screw 71 is formed with oppositely directed flights 74 and 75. The pan carries grain dividers 76, 77, and 78. Secured to the under side of pan 69 are the guards 79, an enlarged view of which is shown in Figures 5 and 6. The guards are provided with rubber shoes 80, each formed with a rubber flap 81. Rubber flaps 81 shorten the inter-guard distance and are of sufficient inherent rigidity to hold a head of wheat erect. If the inter-guard distances were as great as that shown (disregarding the rubber flaps 81) the heads of the wheat would not be sufficiently supported. If the guards were positioned as close as the distance between the edge of rubber flap 81 and the adjacent guard, weeds would jam between the guards. The rubber flaps will give, if weeds are encountered, enabling them to be cut by the sickles 82, which are attached to the sickle bar 83. The sickle bar 83 is mounted for reciprocation and is driven by the drive shown in detail in Figure 9. The end of feeding screw 71 terminates in a shaft 84 which is formed integrally with a bent portion or wobble shaft 85. On the wobble shaft 85 are mounted bearings 86 and 87 on which rotate a sleeve 88. The sleeve carries an arm 89, the end 90 of which is housed by a ball 91, mounted for movement in a socket 92. The socket is secured to the end of sickle bar 83 as can readily be seen by reference to Figure 9. As the feeding screw 71 rotates, the shaft 84 will rotate, moving points on the wobble shaft 85 in circular paths. Inasmuch as the sleeve 88 is free to turn on the wobble shaft and the end of the arm 89 formed with the sleeve is housed in the ball 91, rotation of shaft 84 will cause the arm to oscillate as shown by the dotted lines in Figure 9. There will be a slight reciprocating motion of the end 90 of arm 89 within the ball 91. It will be obvious that the drive is such that the sickle bar will be reciprocated, the amplitude of reciprocation depending upon the angularity of the wobble shaft 85 and the length of arm 89.

The screw 70 acts as a reel, feeding the wheat to the sickle for cutting. Extending rearwardly from the sickle bar at spaced intervals therealong are fingers 93. These serve to agitate the severed heads of wheat and keep them from jamming or packing so that they may be fed uniformly by the feeding screw 71 to the feeding beater 94 which is mounted for rotation upon a shaft 95 as can readily be seen by reference to Figure 4. The gathering auger 70, the feeding auger 71 and the feeding beater 94 rotate in a counterclockwise direction as viewed in Figure 4. The feeding beater passes the grain to the thresher which comprises a concave 96, the upper portion 97 of which is rubber. This concave has mounted therein a threshing cylinder 97, mounted for rotation upon a shaft 98. The threshing cylinder carries, extending from the surface thereof, pins 99 which, in connection with the concave, thresh the grain from the heads of wheat. Blades 100 extend transversely, parallel to the axis of rotation and form in effect a sirocco fan. The threshing cylinder rotates in a clockwise direction. The arrows in Figure 4 indicate the direction of the air blast which is passing through the machine from front to rear. Suction for the fan formed upon the threshing cylinder is taken from the front of the machine. Inasmuch as my combine is adapted to travel at comparatively high speeds, dust is apt to be raised. The suction at the front end of the machine insures that this dust will be blown out rearwardly with the chaff. The blower formed on the threshing cylinder discharges through the passageway 101, formed by the baffle 102 and the pan 103. The conveyor 104 extending between shafts 105 and shafts 106 is driven so that the upper portion thereof moves to the left as viewed in Figure 4. The conveyor is provided with transverse members 107. A feeding cylinder 108 rotates in a counterclockwise direction, as viewed in Figure 4 and discharges the grain and chaff into the passageway 100. The air stream blows the chaff in the direction of the arrows. The grain moves downwardly in a direction contrary to the air flow, insuring a thorough separation of chaff from the grain. The grain is lifted along pan 103 by the transverse members 107. A second blower 109 is mounted for rotation in a clockwise direction upon a shaft 110 and discharges air as shown by the arrows between passageways formed by baffles 111 and 112. The air stream blows the chaff upwardly and the heavier grain will move into the cleaning shoe, indicated generally by the reference numeral 113. The elements 114, 115, and 116, mounted respectively on shafts 117, 118, and 119, are conventional agitators which serve to keep the chaff agitated. The conveyor 120 serves to convey the chaff rearwardly for discharge out of chaff discharge opening 121.

A third blower fan 122 is mounted for rotation on a shaft 123 and discharges air through the cleaning screens 124 and 125 of the cleaning shoe 113. A screen 126 guides the grain into the cleaning shoe. The screen assembly is supported by links 127 and 128 for agitation in a conventional manner, the grain ultimately falling on baffle 129, passing into a trough 131 in which is mounted a conveyor screw 130. The entire cleaning shoe assembly is pivotally mounted about a pivot 133 as can readily be seen by reference to Figures 2 and 4. It is desirable to keep the grain collecting assembly or the cleaning shoe level, irrespective of the angle of inclination of the combine proper, which angle may be varied by raising or lowering the front end of the machine, as has heretofore been described. As has been pointed out, the cleaning shoe and grain collecting assembly is pivoted about pivot 133. The rear end of the assembly is supported by a flexible member such as a flexible wire cable 134, secured by any suitable means at 135. The cable extends over a pulley 136, pulley 137, pulley 138, and is secured to the combine housing by an eye 139. The arrangement is such that the distance from the combine pivot axis to the point 135 is twice the distance from the combine pivot axis to the point 139. In order to keep the grain collecting assembly 113 horizontal when the front end of the machine is raised or lowered, it will be necessary to move the grain collecting assembly through twice the angle moved by the combine housing. Let us assume that the combine moves upwardly through an angle so that point 139 is raised six inches. If point 135 was secured to the combine housing, it would move downwardly twelve inches since the distance from the pivot point to point 135 is twice the distance from the pivot point to point 139. It will therefore be necessary to raise point 135 twelve inches in order to keep the grain collecting assembly horizontal or substantially so. As point 139 moves upwardly through a distance of six inches, due to the pulley 138, the effective length of cable 134 will be shortened twice the distance through which point 139 moves. In other words, the cable will be twelve inches shorter, six of which will extend between point 139 and the pulley, and the other six of which will extend from the pulley back to a point which is the equivalent of point 139. The shortening of the flexible member 134 twelve inches will be reflected by the elevating of point 135 twelve inches, thus in effect keeping the grain collecting assembly horizontal. It will be obvious that this action will take place with sufficient accuracy for practical purposes within the limits of amplitude of movement of the combine housing. The leveling effect is achieved by positioning point 135 a distance twice that of the distance of point 139 from the axis about which the housing rotates, and employing the twofold purchase of pulley 138.

Conveyor screw 130 conveys grain to a centrifugal blower 140 which elevates the grain through duct 141 to the grain collecting bin 36. The grain collecting bin is formed with a downwardly extending funnel bottom 142, having a spout 144 normally closed by a gate 143. The spout may be provided with a spout extension 145. Overflow of grain is blown by blower 146 on the opposite side of trough 130 and passed through recleaning duct 147 for recleaning.

The tractor motor drives a shaft 148. An auxiliary motor 149 drives a shaft 150. Shafts 148 and 150 are coupled by an overrunning clutch 151 as can readily be seen by reference to Figures 13 and 14. The shaft 150 carries a sprocket wheel which drives sprocket chain 152. Sprocket chain 152 drives a sprocket wheel 153 which is keyed to a shaft 154 which rotates in bearings 155 and 156. Shaft 154 is connected by a universal joint 157 to a shaft 158 which is, in turn, connected by universal joint 159 to a shaft 160 which drives shaft 98 of the combined threshercylinder and blower 97 through beveled gears housed in housing 161. This shaft is the main power shaft from which all the other devices are driven by means of suitable sprocket chains or belts such as 162, 163, 164 and 165 in a manner well known to the art.

If the tractor is running at its proper speed, the threshing cylinder, blowers, augers, and other devices will operate with sufficient rapidity to produce good threshing and separation of chaff from the grain. If, however, the tractor is moving slowly due to roughness of the field or for any other reason, the speed of the blowers will be insufficient to produce the desired separation. The auxiliary motor 149 runs at a constant speed and is coupled to shaft 148, driven by the tractor motor by the overrunning clutch 151. The overrunning clutch may be of any suitable type and comprises a housing 166 formed with cam grooves 167 and having rollers 168. The housing 166 is driven by the tractor motor. The shaft 150 is driven by the auxiliary motor. The directions of rotation are shown in Figure 12. It will be obvious that, if the tractor motor is operated at a higher speed than the auxiliary motor, the housing 166 will move relative to shaft 150 in a clockwise direction, causing the rollers 168 to jam and drive the shaft 150 at a higher speed. If, however, the tractor motor is running at a lower speed than the auxiliary motor, the shaft 150 will rotate in a clockwise direction relative to the housing 166 and will tend to move the rollers 168 out of jamming position and permit overrunning of shaft 150 with respect to the housing 166. In this manner, it is always assured that the blowers will be driven at sufficiently high speed to insure good separation.

It will be observed that I have accomplished the objects of my invention. I have provided a novel combine adapted to be used with a tractor, including a novel method of mounting the combine, a novel means for providing connection between the combine mounting and the tractor, a convenient means for adjusting the position of the combine. I have provided an auxiliary power supply which will insure efficient operation of the combine at all times, irrespective of the tractor speed and, at the same time, permit the tractor motor to carry a portion of the load of the combine when the tractor is traveling at sufficiently high speeds. The oppositely directed flights of the feeding screws enable the wheat to be harvested with a comparatively narrow combine, the grain being directed to the center of the machine by the oppositely directed flights. The blowers effect a rapid and efficient separation of the grain from the chaff. A machine built in accordance with my invention harvested wheat while traveling at a rate of twelve miles an hour, which result has never before been accomplished by any combine which has come to my knowledge. The width of the combine with tractor attached is less than twelve feet, enabling it to pass through the conventional twelve-foot gate found on small farms.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a combine a frame, a tractor, means for supporting said frame from said tractor, a combine carried by said frame, said tractor having an engine, means for actuating said combine from said tractor engine, an auxiliary engine carried by said tractor, and overrunning clutch means for coupling said tractor engine to said auxiliary engine.

2. In a combine, a frame, a shaft journaled in said frame, means for securing one end of said shaft to said frame against rotation, an arm secured to the other end of said shaft, said arm carrying an axle, a ground wheel journaled on said axle, a second shaft carried by said frame and a combine pivoted on said shaft.

3. In a combine, a pair of augers each having oppositely directed flights, a beating cylinder, a sickle, the first of said augers being positioned to feed the crop to said sickle and the second of said augers positioned to feed the harvested crop to said beating cylinder.

4. In a combine, a housing, a sickle bar supported by said housing, a first auger for directing the crop against said sickle bar, said auger being provided with oppositely directed flights, a beating cylinder within said housing, a second auger for directing the cut crop to said beating cylinder, a threshing cylinder adapted to receive the crop from the beater, said threshing cylinder being provided with threshing elements, a concave for coaction with said threshing elements for threshing the grain from the crop, fan blades carried by said threshing cylinder, enabling it to act as a fan and means for rotating the combined threshing cylinder and blower fan causing it to take suction from the forward end of the housing, whereby a stream of air will pass over said augers and said beating cylinder.

5. In a combine, a frame, a shaft carried by said frame, a housing, means for pivotally supporting said housing about said shaft, means for pivoting said housing to change its angle to the horizontal, a grain collecting shoe, means for pivotally supporting the forward end of said grain collecting shoe from said housing, a parallel motion means for supporting the rear end of said grain collecting shoe, whereby when said housing is pivoted, said grain collecting shoe tends to remain horizontal.

6. A combine as in claim 5 wherein said parallel motion means comprises a flexible member, one end of said flexible member secured to said grain collecting shoe at a predetermined distance from said housing pivot shaft, the other end of said flexible member being secured to said housing at a distance half of said predetermined distance and on the opposite side of said housing pivot shaft, a pulley carried by said frame, a second pulley carried by said housing, said flexible member passing around said pulleys.

7. In a combine, a housing having the following elements supported therein from front to rear; a first auger having oppositely directed flights, a sickle, a second auger having oppositely directed flights, a beating cylinder, a combined blower fan and threshing cylinder, a feeding beater, a conveyor, a blower fan, baffles for directing air from said blower fan over the threshed grain for blowing the chaff from the grain, a second blower fan, cleaning screens, a baffle for directing the output of said second blower fan over said cleaning screens, said housing assembly being pivotally supported on the shaft, and a frame for supporting said shaft.

CURTIS C. BALDWIN.